US011597458B1

(12) United States Patent
Adkins (10) Patent No.: US 11,597,458 B1
(45) Date of Patent: Mar. 7, 2023

(54) REMOVAL AND STORAGE APPARATUS FOR VEHICLE DOORS (71) Applicant: Claude G. Adkins, Fort Mill, SC (US)

(72) Inventor: Claude G. Adkins, Fort Mill, SC (US)

( * ) Notice: Subject to any disclaimer, the term of this patent is extended or adjusted under 35 U.S.C. 154(b) by 0 days.

(21) Appl. No.: 17/846,337

(22) Filed: Jun. 22, 2022

Related U.S. Application Data (60) Provisional application No. 63/290,358, filed on Dec. 16, 2021.

(51) Int. Cl.
*B25H 1/00* (2006.01)
*B62D 65/06* (2006.01)
*B66F 3/12* (2006.01)
*B62B 3/10* (2006.01)
*B66F 9/06* (2006.01)

(52) U.S. Cl.
CPC ........... *B62D 65/06* (2013.01); *B25H 1/0007* (2013.01); *B62B 3/108* (2013.01); *B66F 3/12* (2013.01); *B62B 2203/10* (2013.01); *B66F 9/06* (2013.01)

(58) Field of Classification Search
CPC ..... B25H 1/0007; B25H 1/00; E04F 21/0023; B62B 3/108; B62B 2203/10; B62B 1/268; B05B 13/0285; Y10S 269/905; B66C 23/48; B66F 7/28; B66F 3/12; B62D 65/06
USPC ............................. 269/17, 152, 905; 254/2 R
See application file for complete search history.

(56) References Cited

U.S. PATENT DOCUMENTS

| 3,977,662 A * | 8/1976 | Cook ...................... F16M 11/42 269/244 |
| 5,120,072 A * | 6/1992 | Laramie .................. B62B 3/009 280/47.17 |
| 2009/0230066 A1* | 9/2009 | Schaerer ................. F26B 25/18 211/60.1 |
| 2010/0001241 A1* | 1/2010 | Rentschler ................ B66F 5/04 254/2 R |
| 2010/0164264 A1* | 7/2010 | Zadai ........................ B66F 3/12 297/325 |
| 2014/0145408 A1* | 5/2014 | Midas ..................... B62B 3/104 280/47.131 |
| 2014/0366352 A1* | 12/2014 | Jang ..................... B62D 65/026 29/281.1 |

(Continued)

FOREIGN PATENT DOCUMENTS

CN          106564829 A  *  4/2017

*Primary Examiner* — Mahdi H Nejad
(74) *Attorney, Agent, or Firm* — Shumaker, Loop & Kendrick, LLP; S. Alexander Long, Jr.

(57) ABSTRACT

An apparatus for supporting a vehicle door, the apparatus comprising a base, a first support column mounted on the base, a lift device mounted on the first support column, the lift device comprising at least a first lift bar and a second lift bar each for engaging and together supporting a vehicle door and an actuator operatively coupled to the lift device. When actuated, the actuator imparts vertical movement to the lift device thereby imparting vertical movement to the vehicle door by way of the first lift bar and second lift bar. A second support column is mounted on the base, and the lift device is mounted on and guided by the first support column and the second support column. A load-bearing bridge member spans a space between the first support column and second support column above the base, and the actuator is mounted on the bridge member.

15 Claims, 8 Drawing Sheets

(56) References Cited

U.S. PATENT DOCUMENTS

2015/0013133 A1\* 1/2015 Lee .................. B62D 65/06
29/281.6

\* cited by examiner

REMOVAL AND STORAGE APPARATUS FOR VEHICLE DOORS

CROSS-REFERENCE TO RELATED APPLICATION

This application claims the benefit of priority of U.S. provisional patent application No. 63/290,358, titled "REMOVAL AND STORAGE APPARATUS FOR VEHICLE DOORS," filed on Dec. 16, 2021, which is incorporated herein in its entirety by this reference.

TECHNICAL FIELD

The invention disclosed in this application relates to an apparatus to assist in removing and replacing vehicle doors, as well as furnishing a storage location for the doors while not on the vehicle.

BACKGROUND

Certain vehicles, for example, some Jeep-brand and Ford Bronco brand vehicles, have removable doors. The doors are mounted on the vehicle chassis by external hinges that receive a hinge pin that is locked into its position by a door hinge bolt that is screwed into a threaded bottom-facing opening and tightened with a wrench. Standard practice is to remove the doors by lowering the door window, disconnecting the quick release wiring harness and then removing the top and bottom door hinge bolts. The door is then lifted using either the top of the open window frame supported by the shoulder of the person removing the door, the interior armrest and/or the bottom of the door to lift the two hinge pins from their respective hinges. The door is then carried to a location, for example, a wall against which it is propped, for storage while not in use. The process is carried out for each door to be removed. Instructions for such procedures are typically provided by the vehicle manufacturer or dealer.

This practice has several disadvantages. First, the doors are heavy, weighing 50 to 60 pounds in some examples, and may not be easily lifted as needed. Second, in replacing the doors, the weight of the door makes it difficult to move the door into the correct position for inserting the hinge pins back in the hinge while also bearing the weight of the door. Third, carrying the removed door runs the risk of bumping the door into a nearby object, or losing control of the door and dropping it, potentially causing damage to the door and/or the person that dropped it. Finally, holding the door while guiding the hinge pin into the hinge is difficult due to the close tolerance of the two elements to each other.

Therefore, there is a need for an apparatus for removing and storing a vehicle door.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, an apparatus for supporting a vehicle door includes: a base; a first support column mounted on the base; a lift device mounted on the first support column, the lift device comprising at least a first lift bar and a second lift bar each for engaging and together supporting a vehicle door; and an actuator operatively coupled to the lift device. The actuator imparts vertical movement to the lift device thereby imparting vertical movement to the vehicle door by way of the first lift bar and second lift bar.

In at least one example, a second support column is mounted on the base, and the lift device is mounted on and guided by the first support column and the second support column.

A load-bearing bridge member may span a space between the first support column and second support column above the base, and the actuator can be mounted on the bridge member.

In at least one example, the lift device includes: an upper lift member on which the first lift bar and the second lift bar are mounted, the upper lift member comprising a first end movably coupled to the first support column, and a second end, opposite the first end, movably coupled to the second support column; a lower lift member on which the lower first lift bar and a lower second lift bar are mounted, the lower lift member comprising a first end movably coupled to the first support column, and a second end, opposite the first end thereof, movably coupled to the second support column; and a lift column having connected to the lower lift member and upper lift member, wherein the lift column maintains the upper lift member at a preset vertical distance above the lower lift member.

The lift column may be connected to central position of the lower lift member and to a central position of upper lift member for load balancing and stability during use.

In some examples, when the actuator imparts vertical movement to the lift device, the lower lift member, the lift column, and the upper lift member travel vertically as a unitary assembly guided by the first support column and second support column.

The first end and second end of the upper lift member are coupled respectively to the first support column and second support column by respective coupling devices, each coupling device comprising a roller.

In at least one example, the first end and second end of the upper lift member are coupled respectively to the first support column and second support column by respective coupling devices by which the first support column and second support column are captured.

Each coupling device may include a bracket, an inner roller, and an outer roller. For each bracket, the respective first support column or second support column may be captured between the inner roller and outer roller thereof.

In at least one example, an upper spanning member connects upper portions of the first support column and second support column above the lift device.

The first support column and second support column in some examples are essentially parallel.

The upper lift member may be connected to the lift column by a lockable mount at an adjustable vertical position above the lower lift member.

The lift device may include a lift member on which the first lift bar and the second lift bar are mounted, the lift member movably coupled to each of the first column and second column.

In some examples, the first lift bar has a first portion and a second portion; the second lift bar has a first portion and a second portion; the first portions of the first and second lift bars extend together in a first direction from the upper lift member; and the second portions of the first and second lift bars extend together in a second direction from the upper lift member opposite the first direction.

In at least one example, the first lift bar is mounted on the lift member at an adjustable position along the lift member by a first lockable mount; and the second lift bar is mounted on the lift member at an adjustable position along the lift member by a second lockable mount.

The base may include: a first support beam upon which the first support column is mounted; a second support beam upon which the second support column is mounted; and at least one spanning members by which the first support beam is connected to the second support beam.

The actuator may be or include a scissor jack.

The apparatus may include pads. For example, a first pad may be mounted on the first support column; and at least one second pad may be mounted on at least one of the first lift bar and second lift bar.

In some examples, the apparatus include wheels on which the base is mounted for movement of the apparatus.

In some examples, the base includes a first support beam, a second support beam, and at least one spanning member connected to each of the first support beam and second support beam. The first support column and second support column are supported by the first support beam and second support beam.

For example, the first support column and second support column may be supported by the first support beam and second support beam via the at least one spanning member, and the first support column and second support column may be positionally adjustable along the at least one spanning member.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

An apparatus as described herein and as illustrated in the drawings is useful at least for removing and storing a vehicle door, and also facilitating replacement of the door when desired, without the need of the person removing the door to bear the weight of the door while moving it to a storage location. The apparatus is useful for storing the door and returning the door to the vehicle. The apparatus may be used by a vehicle owner when wanting to drive the vehicle with the doors removed, or by automotive mechanics or other personnel who may need to remove the doors from a vehicle for replacement or repair.

Figure 1:
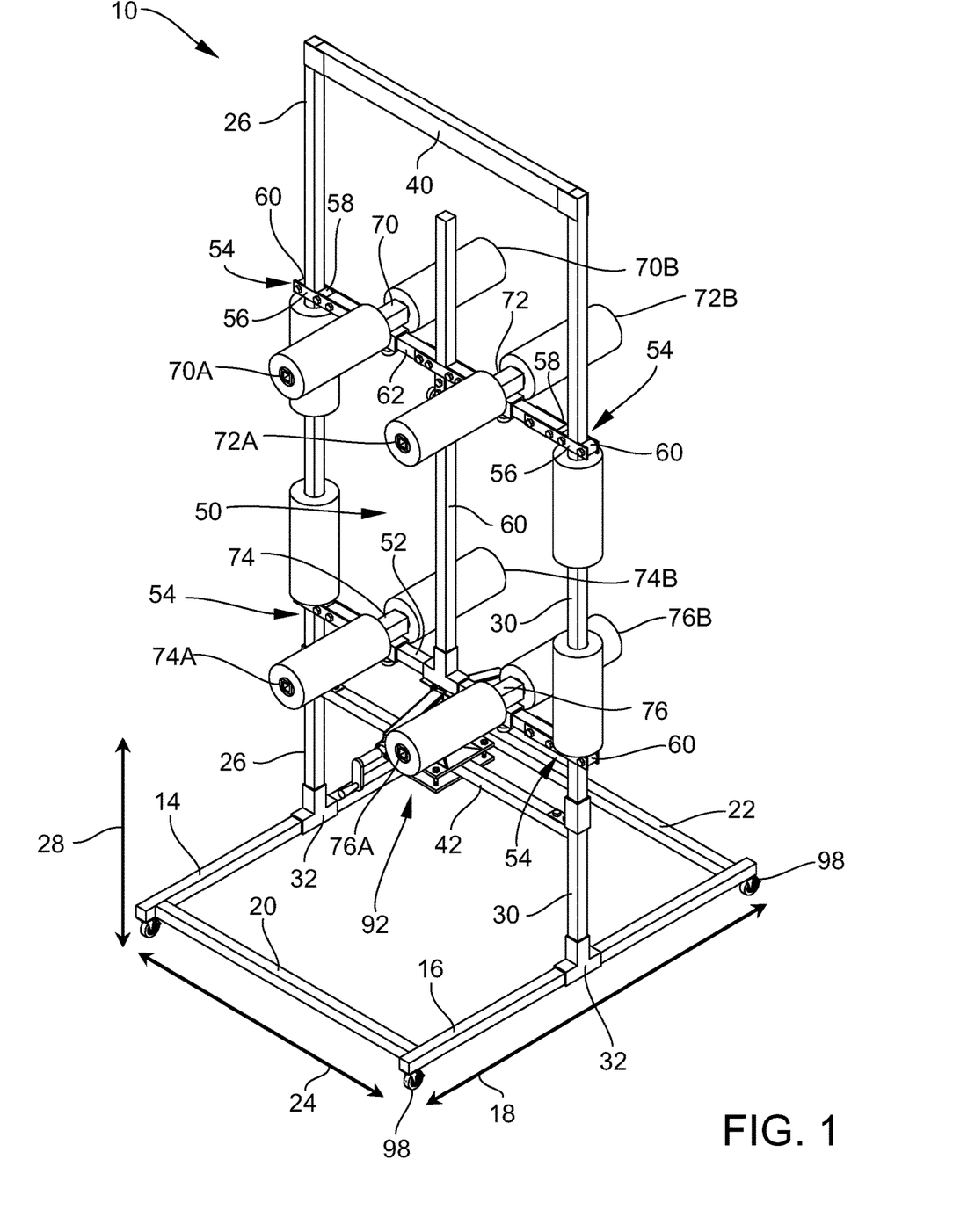
FIG. 1 is a perspective view of an apparatus, according to at least one embodiment, for removal and storage of vehicle doors.

FIG. 1 is a perspective view of an apparatus 10, according to at least one embodiment, for removal and storage of vehicle doors. The apparatus 10 includes a base frame 12, which includes a first support beam 14, and a second support beam 16 spaced from and parallel to the first support beam 14. The first support beam 14 and second support beam 16 have similar or approximately equivalent lengths. The first support beam 14 and second support beam 16, having corresponding respective first ends, are connected by a first spanning member 20. The first support beam 14 and second support beam 16 have corresponding respective second ends opposite the first ends. The second ends are connected by a second spanning member 22 parallel to and spaced from the first spanning member 20. The first spanning member 20 and second spanning member 22 have similar or approximately equivalent lengths, by which, in combination with the first support beam 14 and second support beam 16, the base frame 12 has a rectangular shape in the first and second horizontal dimensions of the drawings, referring to its footprint relative to a floor on which the apparatus 10 stands.

For convenience, the support beams 14 and 16 are referenced herein as extending in a horizontal first dimension 18, and the spanning members 20 and 22 are referenced herein as extending in a horizontal second dimension 24, which is perpendicular to the first dimension.

An upright first support column 26 is connected to and supported by the first support beam 14. A lower end of the first support column 26 is connected to the first support beam 14 at the approximate center of the length of the support beam 14. In the illustrated embodiment, the first support column 26 is connected to the first support beam 14 by a rigid bracket 32 that maintains the first support column 26 as generally vertical and perpendicular to the horizontal first support beam 14.

An upright second support column 30 is connected to and supported by the second support beam 16. A lower end of the second support column 30 is connected to the second support beam 16 at the approximate center of the length of the support beam 16. In the illustrated embodiment, the second support column 30 is connected to the second support beam 16 by a rigid bracket 32 that maintains the second support column 30 as generally vertical and perpendicular to the horizontal second support beam 16.

By these descriptions and as illustrated, the fixed support columns 26 and 30 are parallel, and are spaced from each other in the horizontal second dimension 24 by the spanning members 20 and 22 by way of the support beams 14 and 16. The fixed first support column 26 and fixed second support column 30 have corresponding respective upper ends opposite the lower ends. The first support column 26 and second support column 30 have similar or approximately equivalent heights in the vertical third dimension 28 of the drawings. The upper ends are connected by a fixed upper spanning member 40, which is generally horizontal, extending between the upper ends in the horizontal second dimension 24.

A load-bearing bridge member 42 spans the space between the first support column 26 and second support column 30 at a height 44 above the base frame 12 that assures accommodation of a vehicle door according to the vehicle model or example for which any particular apparatus 10 is configured to serve for removal and storage of the door. The bridge member 42 is generally horizontal, extending in the horizontal second dimension 24. The bridge member 42 has a first end connected to the first support column 26 at the height 44 and a second end, opposite the first end, connected to the second support column 30 at the height 44.

The fixed bridge member 42 serves as the load-bearing base member for a traveling lift device 50 generally supported and stabilized by the support columns. The lift device 50 includes a traveling lower lift member 52 that spans the space between the first support column 26 and second support column 30 at an adjustable height that varies in use of the apparatus 10. The lower lift member 52 is illustrated as horizontal, having a first end movably coupled to the first support column 26, and a second end, opposite the first end, movably coupled to the second support column 30. The first end and second end of the lift member 52 are coupled to the respective first and second support columns 26 and 30 by coupling devices 54 that permit their vertical movement along the columns.

The lift device 50 includes a traveling upper lift member 62 that spans the space between the first support column 26 and second support column 30 above the lower lift member 52. The upper lift member 62 is illustrated as horizontal, having a first end movably coupled to the first support column 26, and a second end, opposite the first end, movably coupled to the second support column 30. The first end and second end of the upper lift member 62 are coupled to the respective first and second support column 26 and 30 by coupling devices 54 that permit their vertical movement along the columns.

In the illustrated embodiment, the coupling devices 54 comprise brackets 56 by which the columns 26 and 30 are captured, the brackets 56 permitting the traveling lift members 52 and 62 to travel upward and downward guided by the columns 26 and 30. Each bracket 56 includes an inner roller 58 and an outer roller 60, with nominal reference to the positions of the rollers as inner and outer with respect to the ends of the lift members and support columns. At the end of each traveling lift member 52 and 62, an inner roller 58 mounted on the bracket 56 engages the corresponding support column (26 or 30). An outer roller 60 mounted on the bracket 56 opposes the inner roller 58 and captures the support column (26 or 30) between the rollers 58 and 60. Other coupling devices are within the scope of these descriptions, including, as non-limiting examples, bearing, low-friction contact surfaces, and pads.

The traveling lift device 50 includes a traveling lift column 60 having a lower end connected to the lower lift member 52 and an upper portion connected to the upper lift member 62. The traveling lift column 60, in use, maintains the upper lift member 62 at a preset vertical distance above the lower lift member 52, all of which are rigid such that the lift device 50 travels up and down as a unitary assembly between the fixed load-bearing bridge member 42 and fixed upper spanning member 40, guided by the support columns 26 and 30. The lift column 60 is connected at the lower end and at an upper portion thereof respectively to central positions of the lower lift member 52 and upper lift member 62 for approximate load balancing and stability during use.

Function of the lift device 50 for door removal and storage comes by way of lift bars in the illustrated embodiment. A first upper lift bar 70 is mounted on the upper lift member 62 between the lift column 60 and fixed first support column 26. The lift bar 70 extends generally as horizontal and along the first dimension 18, perpendicular to the lift member 62, and parallel to the support beams 14. A second upper lift bar 72 is mounted on the upper lift member 62 between the lift column 60 and fixed second support column 30. The second upper lift bar 72 extends generally parallel to the first upper lift bar 70. Having two upper lift bars 70 and 72 as in the illustrated embodiment, as opposed for example to a single lift bar as in some embodiments, serves to stabilize a lifted door by providing multiple load bearing points of contact with the door.

The lift bars 70 and 72 have respective first portions 70A and 72A extending together in a first direction from the upper lift member 62 along the first dimension to lift and support a vehicle door at a first side of the assembly 10. Advantageously, the lift bars 70 and 72 have respective second portions 70B and 72B extending together from the upper lift member 62 in a second direction, opposite the first direction, along the first dimension to lift and support a vehicle door at a second side of the assembly 10 opposite the first side.

The lift device 50, in the illustrated embodiment, includes a first lower lift bar 74, and a second lower lift bar 76, mounted on the lower lift member 52 similarly as with the upper lift member 62 and upper lift bars 70 and 72, the above descriptions of which apply to the lower lift bars 74 and 76. The lower lift bars 74 and 76 have respective first portions (74A, 74B) and second portions (76A, 76B), as described above with reference to the portions of the upper lift bars 70 and 72.

Figure 3:
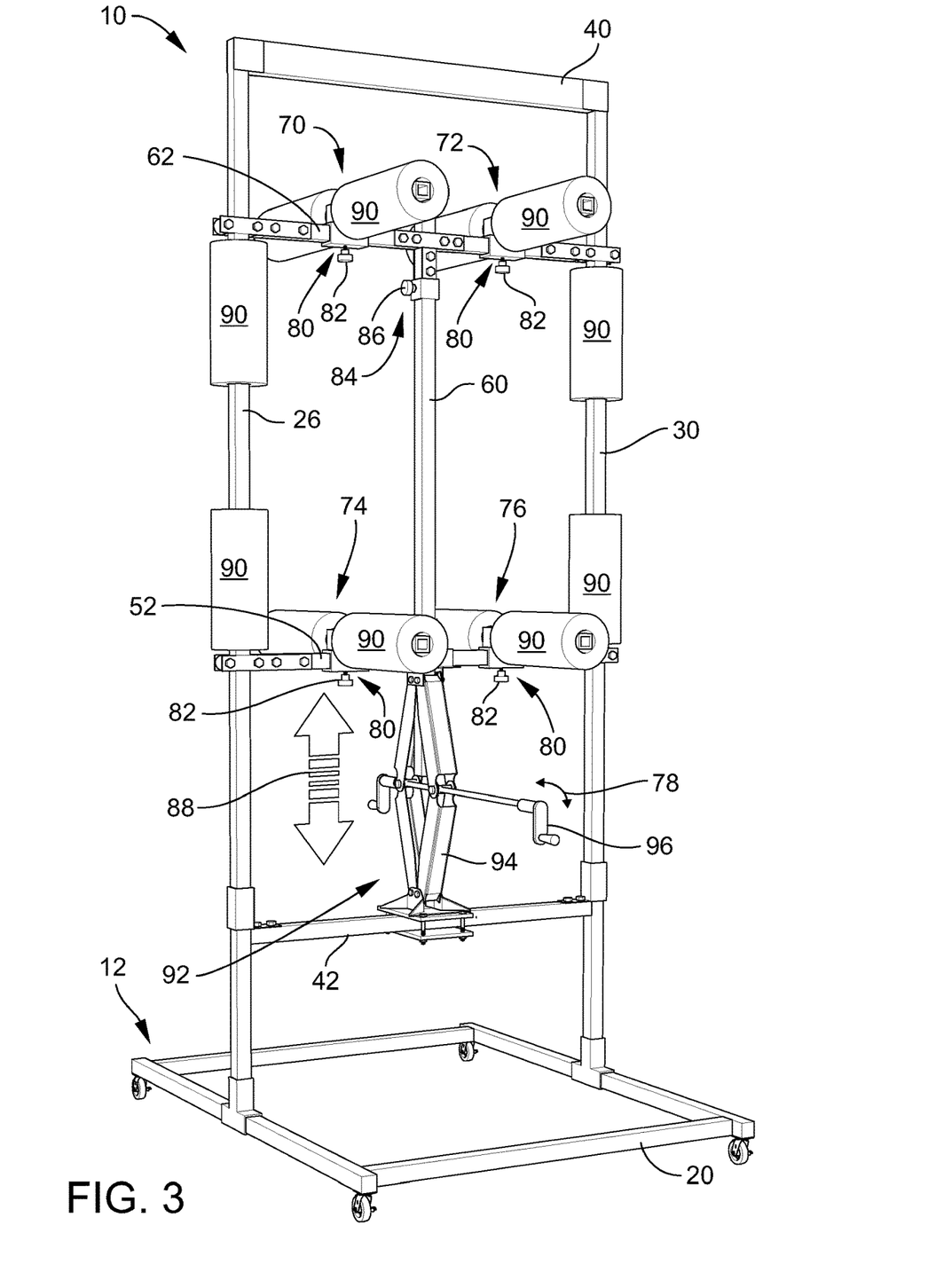
FIG. 3 is a perspective view of the apparatus of FIG. 1 with the lift device thereof raised to a higher position.

Each lift bar, with reference both to the upper lift bars 70 and 72 and lower lift bars 74 and 76, is mounted on a respective lift member at an adjustable position along the lift member by a respective lockable sliding mount 80 (FIG. 3). Each mount 80 can be unlocked by way of a respective knob 82 by which the mount is locked and unlocked to permit its movement along the lift member. For example, the mount 80 may have a threaded hole into which a threaded shank attached to the knob 82 is turned to lock and unlock the mount by engaging the inserted end of the shank against the surface of the lift member. In another embodiment, the knob 82 is connected to a pin that enters a selected hole in the lift member to lock the mount in positions indexed by several such holes. Thus, the lift bars 70-76 can be positioned horizontally along the lift members in the second dimension to accommodate various door types and sizes.

For further adjustment and to accommodate various door types and sizes, the preset vertical position of the upper lift member 62 on the traveling lift column 60 is height adjustable. The upper lift member 62 is mounted on the lift column 60 by a lockable sliding mount 84, for which a range of or several vertical positions are available. The mount 84 can be unlocked by way of a knob 86 by which the mount 84 is locked and unlocked to permit its movement along the lift column 60. For example, the mount may have a threaded hole into which a threaded shank attached to the knob 86 is turned to lock and unlock the mount 84 by engaging the inserted end of the shank against the surface of the lift column 60. In another embodiment, the knob 86 is connected to a pin that enters a selected hole in the lift column 60 to lock the mount in positions indexed by several such holes. Thus, the upper lift member 62 can be positioned vertically along the lift column 60 in the vertical third dimension 28, relative particularly to the lower lift member 52, to assure engagement of both the upper lift bars 70 and 72 and lower lift bars 74 and 76 with a door in use. With proper adjustment, in use of the assembly, a door is supported by cooperation of two upper lift bars 70 and 72 and two lower lift bars 74 and 76 for weight distribution and stability.

In the illustrated embodiment, tubular pads 90 are mounted on several components of the assembly to cushion and protect respective parts of a vehicle door in use of the assembly, and also, with regard to the lift bars, to provide some sizing tolerance for lifting and stabilizing a door. The pads mounted on the lift bars 70-76 are load bearing in use, whereas the pads mounted on vertical components such as the support columns 26 and 30 engage the door with gentle and distributed protective horizontal forces to stabilize the door and prevent its contact with hard components of the assembly.

Figure 2:
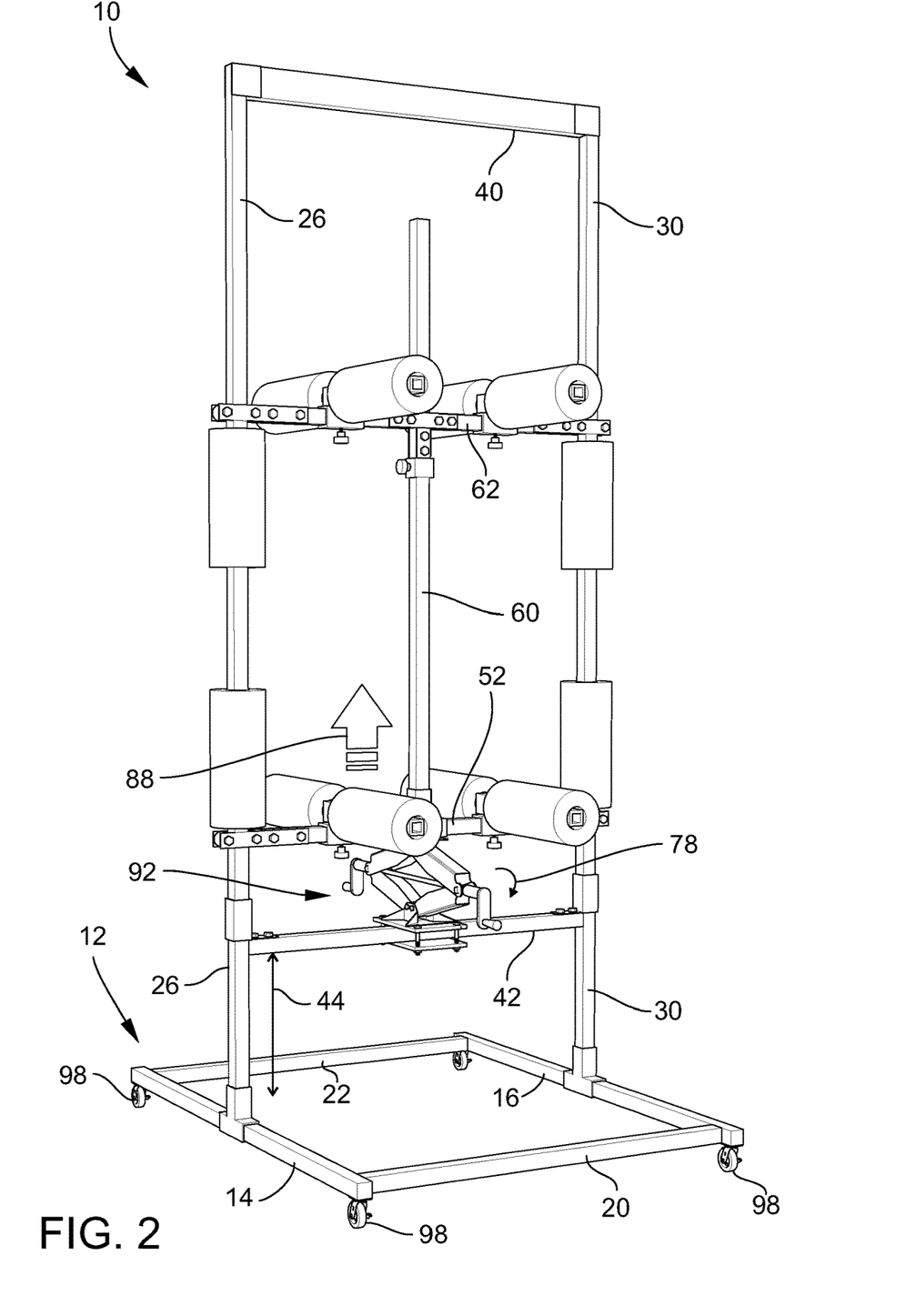
FIG. 2 is a perspective view of the apparatus of FIG. 1 with the lift device thereof being raised from a low position.

The lift device 50 is generally supported by the fixed bridge member 42 by way of a variable actuator 92, which lifts and lowers the lift device 50 as shown in FIGS. 2-3. The actuator 92 has a lower end mounted on the bridge member 42 at a central position thereof below the lift column 60. By actuation of the actuator 92, the lift device 50 is raised from lower positions thereof as represented in FIG. 2, to higher positions thereof as in FIG. 3, and returned at the preference of and under control by a user.

In the illustrated embodiment, the actuator is illustrated as a scissor jack 94 (FIG. 3) having at least one rotary handle 96 for manual actuation to raise and lower the lift device 50 by rotations of the handle. According to the embodiment shown in the drawings, the scissor jack 94 includes a transverse threaded rod connected to the handle 96. Rotation 78 of the handle 96 causes vertical movement 88 of the lower lift member 52. For example, as the handle 96 is rotated in a first rotational direction the jack, lifts the lift device 50. As the handle 96 is rotated in the opposite rotational direction, the jack lowers the lift device 50.

For general movement of the assembly to user-preferred positions, such as along the floor of a garage, wheels 98 are mounted on the base, one wheel 98 at each of four corners of the base defined by the junctions of the support beams (14, 16) and spanning members (20, 22). The wheels 98 may advantageously swivel around vertical axes to permit full free two-dimensional movement of the assembly 10 to navigate a shop floor as moved by a user. The wheels 98 may further be lockable, so as to fix the assembly at a preferred location for storage or stability. The wheels 98 accordingly may be lockable caster wheels as in the illustrated embodiment of the assembly 10.

To prepare the assembly for use with any particular vehicle, load-bearing bridge member 42 can be height-adjusted, for example to the ground clearance of a specific vehicle, and then locked into a stationary vertical position on the support columns 26 and 30, for example, with set screws. To prepare a vehicle door 100 for removal by the apparatus 10, the door is pivoted to an open position, and the window thereof is lowered. Preparation may also include disconnecting the door's quick disconnect wiring harness and/or following any other manufacturer guidelines for door removal preparation.

Figure 4:
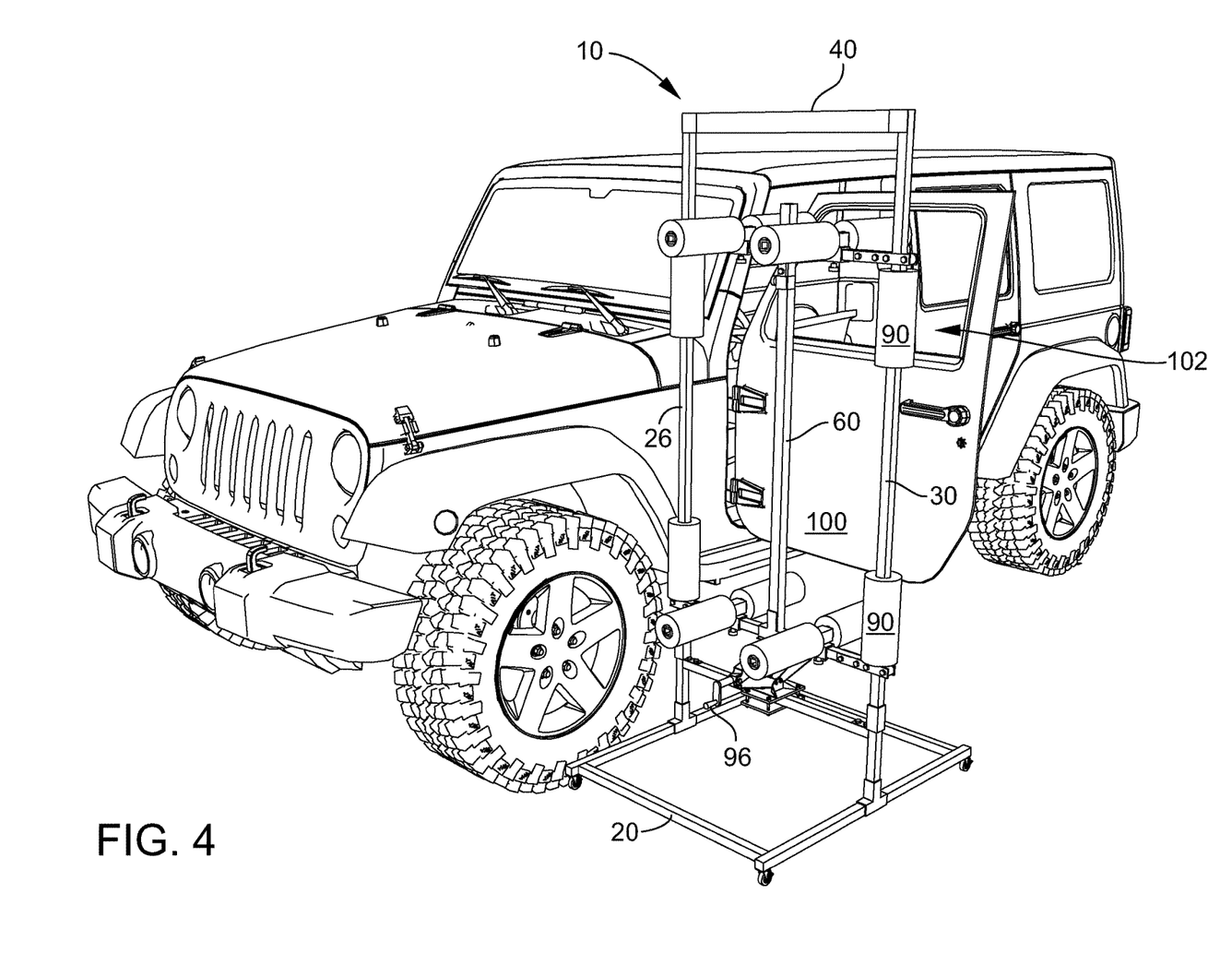
FIG. 4 is a perspective view of the apparatus of FIG. 1 shown adjacent a vehicle in preparation for removing the door thereof.
Figure 5:
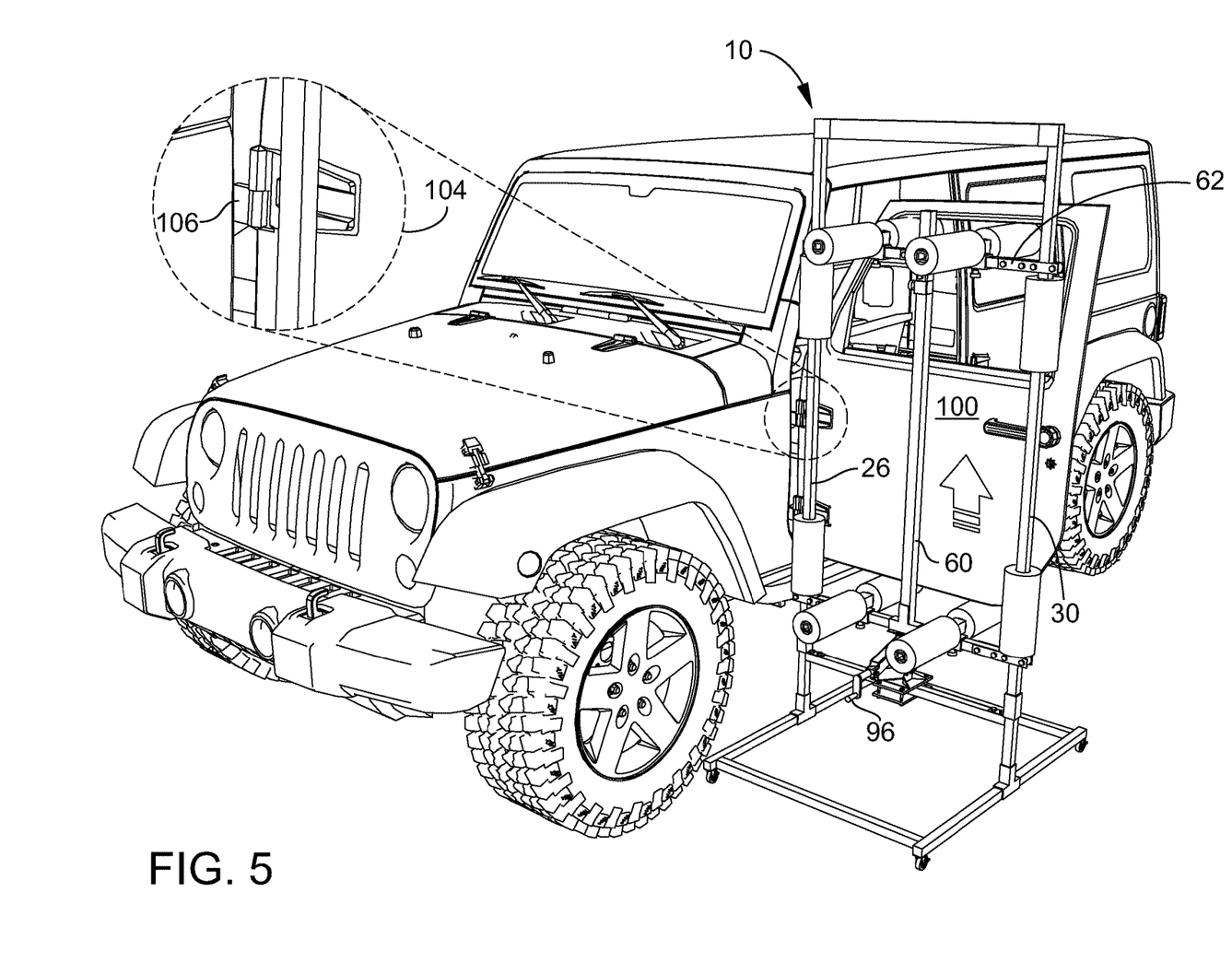
FIG. 5 is a perspective view of the apparatus as in FIG. 4, shown with the apparatus engaging the door is preparation to lift same.

As shown in FIG. 4, the apparatus 10 is rolled into position with lower lift bars under the bottom of the door 100 and upper lift bars extending through the open window 102 of the door. The wheels may then be locked for safety and secured if preferred. The actuator 92 (FIG. 3) is then operated to raise the lift device 50 until the lift bars, for example by way of their respective pads, register with respective door portions as shown in FIG. 5, where the user can confirm that the upper lift member 62 is satisfactorily vertically adjusted on the lift column 60, and that the lift bars are satisfactorily adjusted on the lift members. A magnified view 104 in FIG. 5 shows the upper hinge 106 still engaged.

Figure 6:
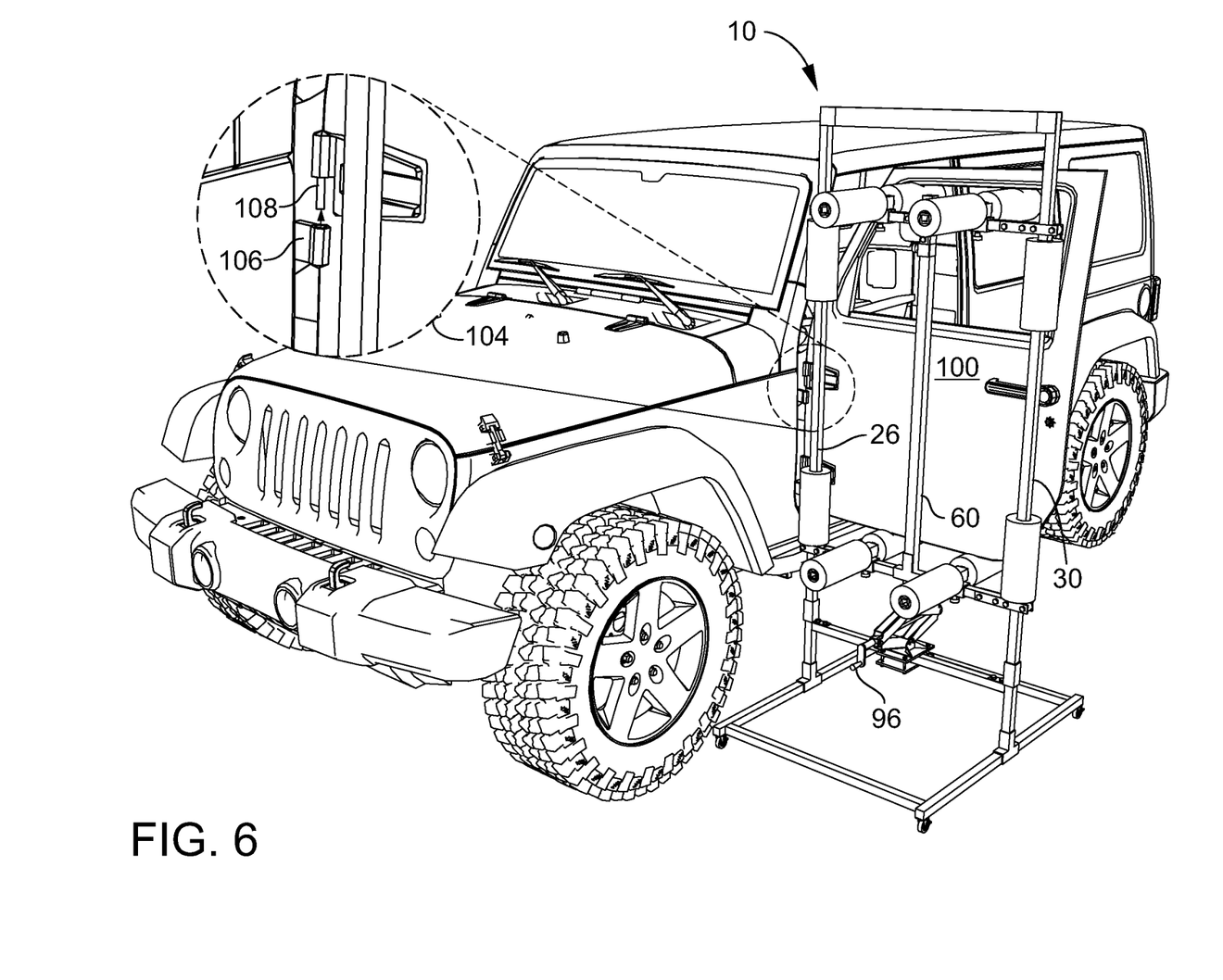
FIG. 6 is a perspective view of the apparatus as in FIG. 4, shown with the apparatus having lifted the door and freed the hinges thereof.
Figure 7:
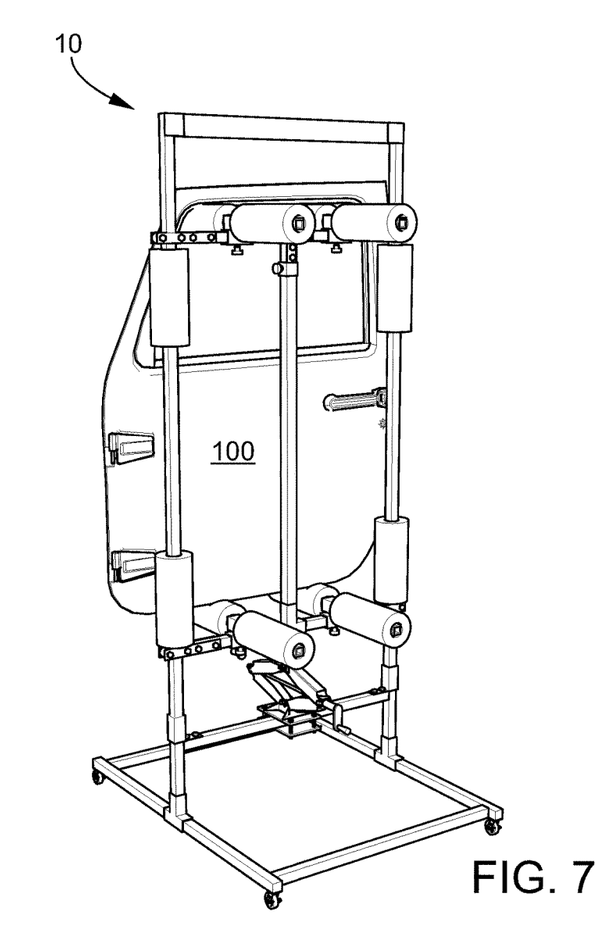
FIG. 7 is a perspective view of the apparatus of FIG. 1 supporting a vehicle door.
Figure 8:
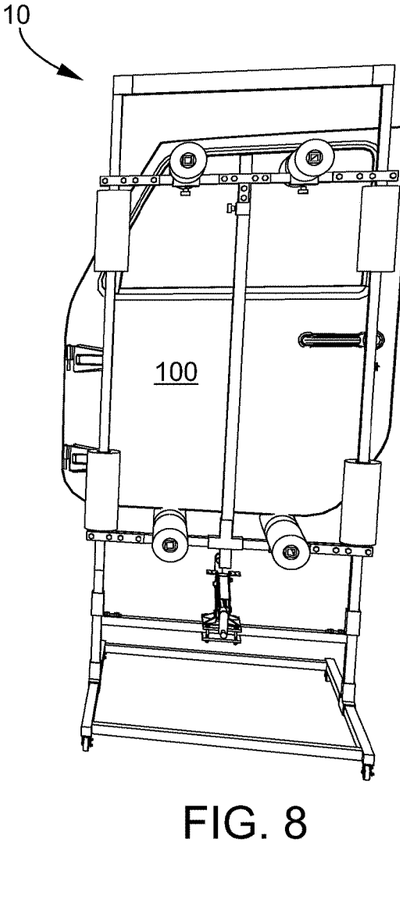
FIG. 8 is another perspective view of the apparatus and vehicle door of FIG. 7.

As shown in FIG. 6, continued lifting by way of the actuator, which in the illustrated embodiment entails rotation of the handle 96 of the scissor jack, lifts the door 100 a sufficient distance to disengage upper and lower door hinges, for example by withdrawal of vertical hinge pins 108 from respective receiving holes. With the door in the lifted position, the wheels can be unlocked and the apparatus 10 can be moved from its lifting position adjacent the vehicle. If it is desired to remove another door, the apparatus 10 can be rolled to the new location and the above process repeated.

When door removal is complete, the apparatus 10 can be rolled to a safe storage location and the wheels locked. As described above, the apparatus 10 is capable of removing and holding two doors. According to the lengths of the lift bars, two doors may be removed onto each side of the apparatus 10 in some embodiments. To maintain balance between the first side and second side of the assembly, doors are advised to be removed onto the first portions and second portions of the lift bars in alternating fashion.

According to a non-limiting embodiment, the apparatus 10 has a height of seventy inches from the base to the upper spanning member 40, with the wheels adding an additional four inches. If desired, the base can be altered to project outwardly from the positions of the support columns to provide stability and to permit more of the base to extend under a vehicle when door removal is taking place. Straps, brackets, shock cords or other retention devices may be used to releasably fasten the doors to the apparatus 10 during storage.

Figure 9:
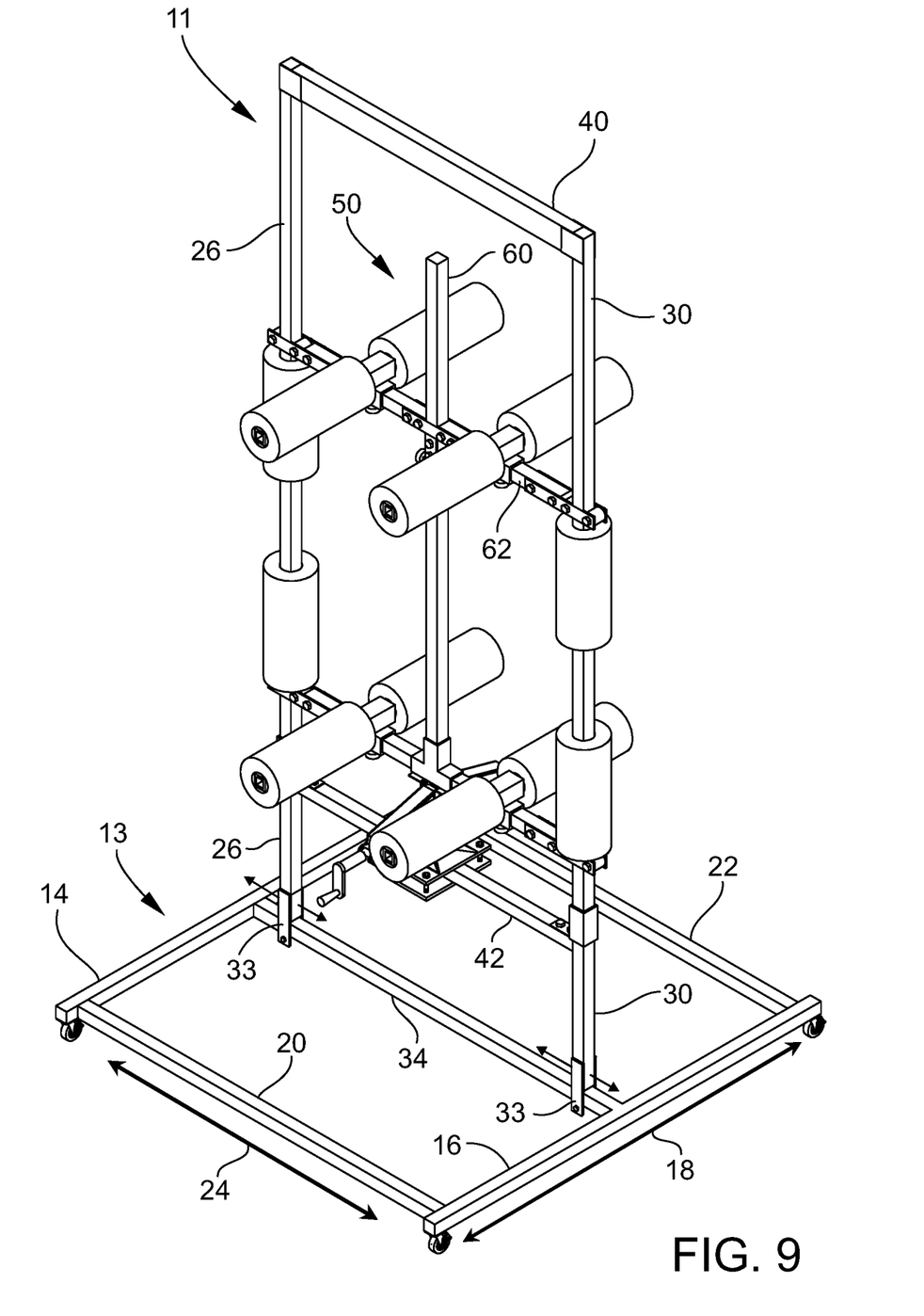
FIG. 9 is a perspective view of an apparatus, according to another embodiment, for removal and storage of vehicle doors.

FIG. 9 is a perspective view of an apparatus 11, according to another embodiment, for removal and storage of vehicle doors. The apparatus 11 has many features and components similar to those of the apparatus 10, such that the above descriptions with reference to FIGS. 1-8 apply as well to FIG. 9, particularly where same reference numbers are shown and/or no distinction is described in the following.

With regard to distinctions in particular, the base frame 13 of the apparatus 11 includes the support beams 14 and 16, and the spanning members 20 and 22, each of which is lengthened relative to its corresponding example in the base frame 12 of FIGS. 1-2. The base frame 13 of FIG. 9 thereby has an expanded footprint relative to that of the base frame 12 in each of the horizontal first dimension 18 and horizontal second dimension 24, increasing stability.

Another distinction is shown with reference to the load-bearing horizontal central spanning member 34 of the base frame 13, by which central portions of the first support beam 14 and second support beam 16 are connected. In the illustrated embodiment of FIG. 9, the central spanning member 34 is disposed between, and is parallel to, the first spanning member 20 and second spanning member 22.

In this embodiment (FIG. 9), the lift device 50 is supported by the central spanning member 34. As shown, the lowers ends of the upright first support column 26 and upright second support column 30, by which the lift device is supported, are each connected to the central spanning member 34 by a respective rigid bracket 33. In the apparatus 11, the support columns 26 and 30 are supported by the support beams 14 and 16 via the central spanning member 34. In the base frame 12 of the apparatus 10 (FIGS. 1-2), the support columns 26 and 30 are supported more directly by the support beams 14 and 16.

The apparatus 11 has an additional advantageous mode of adjustment, with reference now to positions of the lower ends of the support columns 26 and 30 and respective brackets 33, which are adjustable along the central spanning member 34. By way of the arrows at the lower ends of the support columns 26 and 30, FIG. 9 shows that the lift device 50 is thereby positionally adjustable along the central spanning member 34 in the horizontal second dimension 24.

An apparatus to assist in removing and replacing vehicle doors, as well as furnishing a storage location for the doors while not on the vehicle is described above. Various details of the invention may be changed without departing from its scope. Furthermore, the foregoing description of the preferred embodiment of the invention and the best mode practicing the invention are provided for the purpose of illustration only and not for the purpose of limitation.

What is claimed is:

1. An apparatus for supporting a vehicle door, the apparatus comprising:
   a base;
   a first support column mounted on the base;
   a second support column mounted on the base;
   a lift device mounted on and guided by the first support column and the second support column, the lift device comprising:
      an upper lift member comprising a first end movably coupled to the first support column, and a second end, opposite the first end thereof, movably coupled to the second support column;
      a lower lift member comprising a first end movably coupled to the first support column, and a second end, opposite the first end thereof, movably coupled to the second support column;
      a first upper lift bar mounted on the upper lift member and a second upper lift bar mounted on the upper lift member;
      a first lower lift bar mounted on the lower lift member and a second lower lift bar mounted on the lower lift member;
      wherein a first portion of the first upper lift bar and a first portion of the second upper lift bar extend together in a first direction from the upper lift member for engaging and at least in part supporting a first vehicle door;
      wherein a first portion of the first lower lift bar and a first portion of the second lower lift bar extend together in the first direction from the lower lift member for engaging and at least in part supporting the first vehicle door in cooperation with the first portion of the first upper lift bar and the first portion of the second upper lift bar;
      wherein a second portion of the first upper lift bar and a second portion of the second upper lift bar extend together in a second direction from the upper lift member for engaging and at least in part supporting a second vehicle door, the second direction being opposite the first direction; and
      wherein a second portion of the first lower lift bar and a second portion of the second lower lift bar extend together in the second direction from the lower lift member for engaging and at least in part supporting the second vehicle door in cooperation with the second portion of the first upper lift bar and the second portion of the second upper lift bar;
   wherein the apparatus further comprises an actuator operatively coupled to the lift device, the actuator, when actuated, imparting vertical movement to the lift device thereby imparting vertical movement to the first vehicle door and to the second vehicle door by way of the upper lift member and the lower lift member;
   wherein the lift device further comprises a lift column, wherein the lower lift member is connected to the lift column, and the upper lift member is connected to the lift column by a lockable mount at an adjustable vertical position above the lower lift member, and wherein the lift column maintains the upper lift member at a preset vertical distance above the lower lift member when the lockable mount is locked.

2. The apparatus of claim 1, further comprising a load-bearing bridge member spanning a space between the first support column and the second support column above the base, wherein the actuator is mounted on the bridge member.

3. The apparatus of claim 1, wherein the lift column is connected to a central position of the lower lift member and to a central position of the upper lift member for load balancing and stability during use.

4. The apparatus of claim 1, wherein, when the actuator imparts vertical movement to the lift device, the lower lift member, the lift column, and the upper lift member travel vertically as a unitary assembly guided by the first support column and by the second support column.

5. The apparatus of claim 1, wherein the first end and the second end of the upper lift member are coupled respectively to the first support column and the second support column by respective coupling devices, each coupling device comprising a roller.

6. The apparatus of claim 1, wherein the first end and the second end of the upper lift member are coupled respectively to the first support column and the second support column by respective coupling devices by which the first support column and the second support column are captured.

7. The apparatus of claim 6, wherein each coupling device comprises a bracket, an inner roller, and an outer roller, and wherein for each bracket, the respective first support column or the second support column is captured between the inner roller and the outer roller thereof.

8. The apparatus of claim 1, further comprising an upper spanning member connecting upper portions of the first support column and the second support column above the lift device.

9. The apparatus of claim 8, wherein the first support column and the second support column are essentially parallel.

10. The apparatus of claim 1, wherein:
the first upper lift bar is mounted on the upper lift member at an adjustable position along the upper lift member by a first lockable sliding mount; and
the second upper lift bar is mounted on the upper lift member at an adjustable position along the upper lift member by a second lockable sliding mount.

11. The apparatus of claim 1, wherein the base comprises:
a first support beam;
a second support beam; and
at least one spanning member connected to each of the first support beam and the second support beam,
wherein the first support column and the second support column are supported respectively by the first support beam and the second support beam.

12. The apparatus of claim 11, wherein:
the first support column and the second support column are supported respectively by the first support beam and the second support beam via the at least one spanning member; and
the first support column and the second support column are positionally adjustable along the at least one spanning member.

13. The apparatus of claim 1, wherein the actuator comprises a scissor jack.

14. The apparatus of claim 1, further comprising:
a first pad mounted on the first support column; and
at least one second pad mounted on at least one of the first upper lift bar, the second upper lift bar, the first lower lift bar and the second lower lift bar.

15. The apparatus of claim 1, further comprising wheels on which the base is mounted for movement of the apparatus.

* * * * *